No. 863,639. PATENTED AUG. 20, 1907.
N. M. POWELL.
FRICTION CLUTCH.
APPLICATION FILED DEC. 22, 1

2 SHEETS—SHEET 1.

Witnesses
Wm Bodge
N C Miller

Inventor
Nicholas M. Powell
By his Attorney
Frank H. Ashley

No. 863,639.

PATENTED AUG. 20, 1907.

N. M. POWELL.
FRICTION CLUTCH.
APPLICATION FILED DEC. 22, 1906.

2 SHEETS—SHEET 2.

Witnesses
Wm Bodge
M. E. Miller

Inventor
Nicholas M. Powell
By his Attorney
Frank H. Dickey

UNITED STATES PATENT OFFICE.

NICHOLAS M. POWELL, OF NEW YORK, N. Y., ASSIGNOR OF ONE-HALF TO LEWIS G. YOUNG, OF NEW YORK, N. Y.

FRICTION-CLUTCH.

No. 863,639.  Specification of Letters Patent.  Patented Aug. 20, 1907.

Application filed December 22, 1906. Serial No. 349,203.

*To all whom it may concern:*

Be it known that I, NICHOLAS M. POWELL, a citizen of the United States, residing at No. 1712 Fulton street, city of New York, in the borough of Brooklyn, county of Kings, New York, have invented certain new and useful Improvements in Friction-Clutches, of which the following is a specification.

The present invention relates to friction clutches and particularly to that type in which a drum coöperates with a spring which surrounds the same in the form of a coil and is drawn tightly to the drum to connect the driving part with the driven part.

The object of the invention is to provide a clutch of this character which will be simple in its parts and in which the wearing parts may be easily replaced by new parts at a very small expense, and also to provide a clutch which may be attached to the part to be driven by means of the frictional surfaces of the clutch engaging gradually to drive the load while the driving means, such as a gas engine, is running at full speed, and to connect the driving means to the driven part so gradually that no shock or jar will result in starting the load from rest to full speed, such for example as starting a vehicle from a position of rest to full speed without jarring or excessive vibration.

My invention consists primarily in placing between the coil spring and the drum, a member or plurality of members, which serve as the wearing parts or renewable parts, and also in providing a modification in which the coil spring is dispensed with and other clamping means are used to hold the wearing members in place and by means of which the rotation of the motor may be reversed and the load still driven by the clutch, whereas with the coil spring, this advantage cannot be attained.

Figure 1:
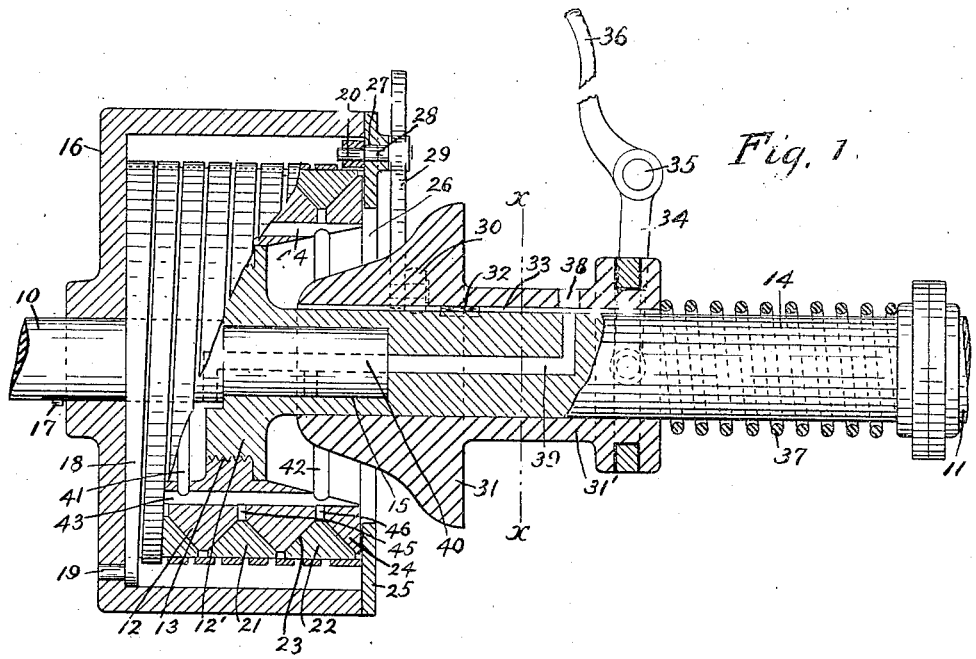
Figures 2, 3:
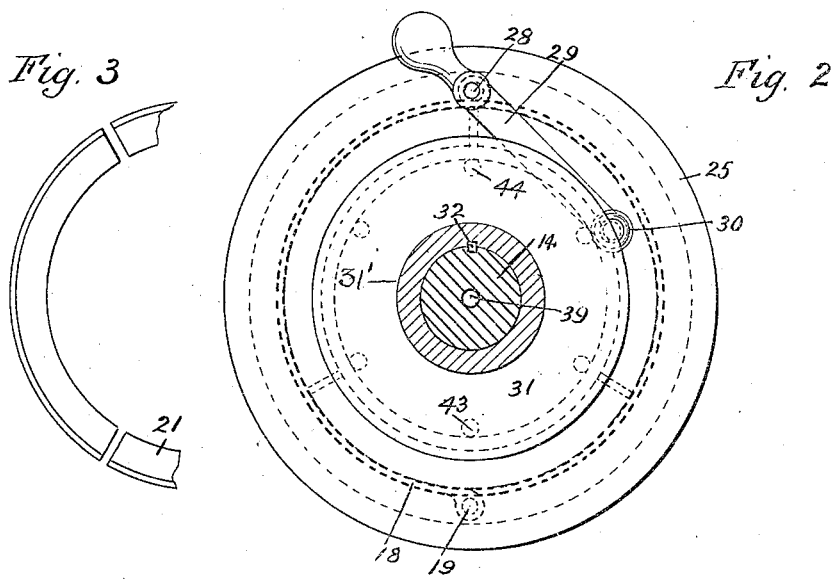
Figure 4:
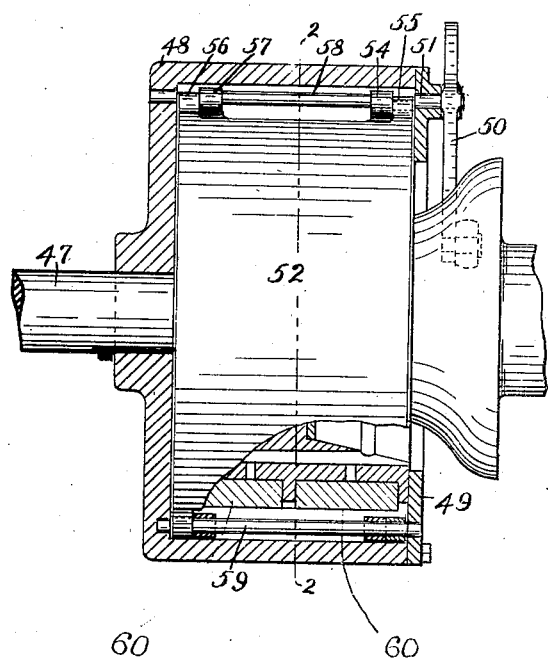
Figure 5:
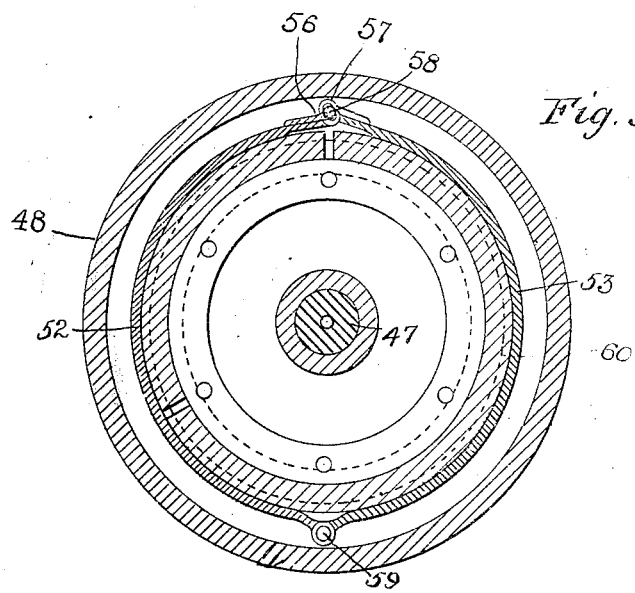

Referring to the drawings which form part of this specification, Figure 1, is a longitudinal sectional view with parts shown in elevation, of the clutch and the means used to operate the same. Fig. 2, is a cross sectional view of Fig. 1, on line X—X thereof. Fig. 3, is a side view of one of the sections and a part of two other sections, shown in this case as part of a ring triangular in cross section. Fig. 4, is a view, partly in section, of the modified form showing the rings as rectangular in cross section and illustrating the clamping means used to force the ring sections in engagement with the drum. Fig. 5, is a cross sectional view on line 2—2 of Fig. 4.

One of the important objects of this invention is to provide means whereby the parts in frictional contact may be liberally supplied with oil, so that excessive wear may be avoided and also to insure the smooth working of the clutch.

Referring to the clutch as constructed and shown in Fig. 1, 2 and 3, 10 indicates the driving shaft, which we will assume in this case to be the motor shaft, and 11 indicates the driven shaft which we will assume to be connected to the driven gear of an automobile.

12 indicates the drum ring and 12′ the core piece thereof which is connected thereto in the present case by a screw thread 13, but which may be connected in any desirable manner, and after the parts are screwed together they are keyed to prevent their separation in a manner well known to the art.

Formed integral with the core piece 12′ is a shaft extension 14 which is provided with a recess 15 at one end, into which one end of the shaft 10 projects, and serves as a bearing therefor.

Mounted on the shaft 10 is a casing 16 which is secured to the shaft by a key 17 as shown, and connected to the casing 16 is a coil spring 18 connected to the casing by an angular projection 19 at one end, and to the crank-pin 20 at its opposite end, the coils of the spring 18 inclosing and bearing on the ring sections 21—22 etc., and by tightening said coil, serving to press said sections tightly against the drum 12 to frictionally engage the same, as will be readily understood.

In order to provide a large friction surface between the drum 12 and the ring sections 21—22 etc., the inner faces of the sections are beveled and the drum is correspondingly provided with grooves having beveled or inclined sides 23—24 etc., which serve to increase the area of contact between the drum and the ring sections, as will be readily understood.

Connected to the casing 16 is a flange 25 provided with an opening 26, and located in the upper part of said flange is a bearing 27 in which is located the shaft 28 which is formed integral with the crank-pin 20, and connected to said shaft is a lever 29 having a roller 30 at one end adapted to coöperate with a cam 31 mounted on the shaft extension 14, and held in relative position thereon by a feather or key 32, which is sunk into the shaft extension and engages with a key-way 33 formed in the bore of the cam 31, thereby permitting the cam 31 to reciprocate relative to the shaft extension 14.

Connected to the cam 31 and formed integral with same is a sleeve 31′ provided at its rear end with an enlargement having a groove therein, and located in said groove is a loose fitting ring serving as one end of a lever 34 which is pivoted at 35 to some suitable part, and the upper end 36 serves to operate the same by foot pressure which serves to force the cam against the pressure exerted by the spring 37, and away from and out of engagement with the lever 29, thus disengaging the friction surfaces of the clutch members, as will be easily understood.

Located in the sleeve of the cam is an opening 38 which is in line with an opening in the shaft 14 which is drilled into said shaft and extends to the end of the shaft 10 in which is formed a passage 40 which leads to an opening within the core piece 12' and serves to introduce oil into said core piece through radial grooves 41—42 etc., which grooves intersect drilled passages 43—44 etc., which communicate with passages 45—46 etc., which lead to the faces of the ring sections, thereby carrying the oil through said passages to the said sections by centrifugal action and serving to keep them in proper working condition.

It will thus be seen that the spring 37 keeps the cam normally in engagement with the lever 29 and thereby holds the spring coil under tension and the clutch in engagement, and that by forcing the cam 31 out of engagement with the lever, the spring coil is relaxed and the clutch surfaces disengaged.

Referring to Fig. 4, and 5, 47 indicates the driving shaft and 48 a casing connected thereto in the same manner as that described in Fig. 1, and is provided with a flange 49 which supports a lever 50 and crankshaft 51 in the same manner as before described, but in this case there is provided a double throw crank at each side of the clamps 52—53 at the top side thereof indicated by 54—55 and 56—57 and formed on a shaft 58 which serves to support and hold them in proper alinement respectively. The clamping members 52—53 are hinged at their lower ends to a shaft 59 the ends of which are supported in recesses in the casing and flange respectively as shown.

The ring members 60 are rectangular in cross section instead of triangular, and the clamping members press the ring members into engagement through the instrumentality of the lever which acts to throw the adjacent crank-pins in opposite directions and thereby tighten the clamps onto the ring sections, as will be easily understood by those skilled in the art of mechanics.

The oil passages are formed in substantially the same manner as previously set forth in the description of the construction of Fig. 1, and the operation is practically the same as previously described, except that this construction permits the clutch to remain in engagement regardless of the direction of rotation of the driving shaft, whereas the reverse rotation of the driving shaft in Fig. 1, would serve to loosen the coil spring on the section members. The section members may be made of soft metal or hard wood or leather, or in fact of any suitable material that will wear well in practice and are held in position by the clamps or spring as the case may be, so that they may be quickly removed and replaced by new ones in case of wear.

The parts are so simple that further description thereof is deemed unnecessary.

In operation, assuming the motor to be running at full speed and the automobile at rest due to the operator's foot holding the cam 31 in such position as to relax the braking action of the lever 29, the operator by allowing the cam to gradually operate the lever, gradually tightens the spring and forces the sections onto the drum, and the sections slip more or less between the spring or clamps as the case may be, one in advance of the other, and this differential slipping serves to graduate the power applied to the drum and the vehicle will gradually start and increase in speed without shock or jar, as has been demonstrated in actual practice with the construction shown in Fig. 1.

The form and number of the sections may be changed and they may be divided into more or less length of section as the service may require without departing from the invention, and I therefore do not wish to limit myself to the exact construction shown herein, but reserve to myself all forms that come fairly within the scope of my invention.

Having thus described my invention what I claim as new and desire to secure by Letters Patent is,

1. A clutch comprising a casing, a drum in said casing provided with a shaft which extends beyond one end thereof, a friction member constructed to fit the outer periphery of said drum, a clamping member the end of which is operatively connected to said casing, said friction member being free to slide relative to said drum and clamping member, and means for tightening said clamping member on said friction member and thereby forcing said friction member forcibly in contact with said drum.

2. A clutch comprising a casing, a drum in said casing provided with a shaft which extends beyond the end thereof, the outer surface of said drum serving as a friction surface, a plurality of friction members constructed to fit said drum and adapted for frictional engagement therewith, clamping means connected to said casing and serving to hold said friction members in operative position on said drum, said friction members being free to slide relative to said drum and clamping member, and means for forcing said clamping means on said friction members.

3. A clutch comprising a casing, a cylindrical drum in said casing provided with a shaft which extends beyond one end thereof, a plurality of friction members comprising sections of a ring constructed to conform to the outer surface of said drum, said friction members being free to slide relative to said drum and clamping member, clamping means connected to said casing, and means for forcing said clamping means against said friction members to hold the same in frictional engagement with said drum.

4. A clutch comprising a casing, a cylindrical drum in said casing provided with a shaft which extends beyond one end thereof, and having a plurality of grooves in its outer surface, a plurality of ring segments located in said grooves, clamping means connected to said casing, said ring segments being free to slide relative to said drum and said clamping means, and means for forcing said clamping means against said ring segments to cause frictional engagement between said segments and said drum.

5. A clutch comprising a casing, a drum in said casing provided with a shaft which extends beyond one end thereof, a friction member constructed to fit the outer periphery of said drum, a clamping member the ends of which are operatively connected to said casing, said friction member adapted to slide relative to said drum and clamping member, means for tightening said clamping member on said friction member and thereby forcing said friction member in contact with said drum, said means comprising a lever connected to a crank which in turn is connected to said clamping member, and a cam constructed to operate said lever.

6. A clutch comprising a casing, a cylindrical drum in said casing provided with a shaft which extends beyond one end thereof, said drum having a plurality of grooves in its surface, a plurality of ring segments located in said grooves, clamping means connected to said casing, said ring segments being movable circumferentially relative to said drum and clamping means, means for forcing said clamping means against said ring segments to cause frictional engagement between said segments and said drum, said means comprising a crank connected to said clamping means, a lever connected to said crank, a cam adapted to operate said lever, and a spring in operative relation with respect to said cam.

7. A clutch comprising a casing, a cylindrical drum in said casing provided with a shaft extension, a plurality of friction members comprising sections of a ring constructed to conform to the outer surface of said drum, clamping means connected to said casing, said ring being movable circumferentially relative to said drum and clamping means, and means for forcing said clamping means against said frictional members to hold same in engagement with said drum, said drum and shaft extension having passages adapted to convey oil to the inner faces of said friction members.

8. A clutch comprising a casing, a cylindrical drum in said casing provided with a shaft extension, a friction section conforming to the drum periphery, a spiral spring, embracing said drum and friction section and having one end connected to the casing, said friction section being movable circumferentially relative to said drum and spring, and means connected to the other end of the spring for contracting or relaxing the same; the drum shaft and drum containing passages leading to the friction member for lubricating the same under contrifugal action.

9. A clutch comprising a casing, a drum in said casing, a friction member constructed to fit the outer periphery of said drum, a clamping member one end of which is operatively connected to said casing, said friction member being free to slide relative to said drum and clamping member and means for tightening said clamping member on said friction member and thereby forcing said friction member forcibly in contact with said drum.

10. A clutch comprising a drum provided with a shaft which extends beyond one end thereof, a friction member constructed to fit the outer periphery of said drum, a clamping member, and means for tightening said clamping member on said friction member and thereby forcing said friction member forcibly in contact with said drum, said friction member being free to slide relative to said drum and clamping member.

11. A clutch comprising a casing, a drum in said casing provided with a shaft which extends beyond one end thereof, a friction member constructed to fit the outer periphery of said drum, and a clamping member comprising a strip of metal formed in the shape of a helix, one end of which is operatively connected to said casing, said friction member being free to slide relative to said drum and clamping member, and means for tightening said clamping member on said friction member and thereby forcing said friction member forcibly in contact with said drum.

12. A clutch comprising a casing, a drum in said casing provided with a shaft which extends beyond one end thereof, said shaft having a conduit which leads within said drum and said drum having a plurality of passages which communicate with the under side of a friction member, a friction member constructed to fit the outer periphery of said drum, a clamping member one end of which is operatively connected to said casing, said friction member being free to slide relative to said drum and clamping member, and means for tightening said clamping member on said friction member and thereby forcing said friction member forcibly in contact with said drum.

In testimony whereof, I, NICHOLAS M. POWELL have signed my name to this specification in the presence of two subscribing witnesses, this 6th day of December 1906.

NICHOLAS M. POWELL.

Witnesses:
AMELIA BLAUVELT,
N. C. MILLER.